United States Patent [19]
Tozu et al.

[11] Patent Number: 6,070,952
[45] Date of Patent: Jun. 6, 2000

[54] BRAKING FORCE CONTROL SYSTEM FOR AN AUTOMOTIVE VEHICLE

[75] Inventors: Kenji Tozu, Yokkaichi; Yoshiyuki Yasui, Kariya; Masanobu Fukami, Aichi pref; Takayuki Itoh, Nagoya; Norio Yamazaki, Kariya, all of Japan

[73] Assignee: Aisin Seiki Kabushiki Kaisha, Kariya, Japan

[21] Appl. No.: 08/853,458

[22] Filed: May 9, 1997

[30] Foreign Application Priority Data

May 10, 1996 [JP] Japan ..................................... 8-140709

[51] Int. Cl.$^7$ .............................. B60T 8/24; B60T 8/48; B60T 8/60
[52] U.S. Cl. ............................................. 303/146; 303/140
[58] Field of Search ..................... 303/140, 146, 303/147, 148

[56] References Cited

U.S. PATENT DOCUMENTS

| | | |
|---|---|---|
| 4,898,431 | 2/1990 | Karnopp et al. . |
| 5,333,058 | 7/1994 | Shiraishi et al. ..................... 303/146 X |
| 5,494,345 | 2/1996 | Inagaki et al. . |
| 5,732,377 | 3/1998 | Eckert ................................. 303/140 X |

FOREIGN PATENT DOCUMENTS

| | | |
|---|---|---|
| 195 03 148 | 8/1995 | Germany . |
| 195 15 059 | 5/1996 | Germany . |
| 40-2070561 | 3/1990 | Japan ...................................... 303/146 |

*Primary Examiner*—Matthew C. Graham
*Attorney, Agent, or Firm*—Burns, Doane, Swecker & Mathis, LLP

[57] ABSTRACT

The present invention is directed to a braking force control system for an automotive vehicle having a hydraulic braking pressure control apparatus which is provided for applying the braking force to each of front and rear wheels of the vehicle at least in response to depression of a brake pedal. A desired yaw rate is set in accordance with a motion of the vehicle, and an actual yaw rate of the vehicle is measured. A varying rate of the desired yaw rate is calculated, and a varying rate of the actual yaw rate is calculated. Then, a deviation between the varying rate of the desired yaw rate and the varying rate of the actual yaw rate is calculated. And, a limitation unit is provided for actuating the hydraulic braking pressure control apparatus to limit the varying rate of the actual yaw rate by applying the braking force to at least one of the wheels, when the deviation exceeds a predetermined value. The limitation unit may be so constituted as to apply the braking force to a front wheel of the wheels which is located on the outside of a curve in the vehicle's path.

8 Claims, 14 Drawing Sheets

BRAKING FORCE CONTROL SYSTEM FOR AN AUTOMOTIVE VEHICLE

BACKGROUND OF THE INVENTION

1. Field of the Invention

The present invention relates to a braking force control system for an automotive vehicle, and more particularly to the braking force control system which is adapted to maintain a characteristic of a steering control for tracing a vehicle's path against a rapid yaw rate variation of the vehicle, by applying a braking force to at least one of the wheels of the vehicle irrespective of depression of a brake pedal.

2. Description of the Related Arts

Recently, a vehicle is provided with a vehicle motion control system for controlling the braking force applied to the vehicle to perform an anti-skid control, a traction control, a front-rear braking force distribution control, and etc. In the U.S. Pat. No. 4,898,431, for example, an apparatus for controlling braking force through the use of a brake controlling system which compensates for the influence of lateral forces on the vehicle. The apparatus is constituted so as to control the braking force applied to the vehicle by the braking force control system in response to a comparison of a desired yaw rate with an actual yaw rate, thereby to improve the vehicle stability during the course of vehicle motion such as cornering.

In general, "oversteer" and "understeer" are used to indicate a vehicle steering characteristic. When the oversteer is excessive during vehicle motion such as cornering, the rear wheels of the vehicle have a tendency to slip excessively in the lateral direction to cause a decrease in turning radius of the vehicle. The oversteer occurs when a cornering force CFf of the front wheels largely exceeds a cornering force CFr of the rear wheels (i.e., CFf>>CFr). As shown in FIG. 20, when a vehicle VL is undergoing a cornering maneuver along a curve of a turning radius R, for example, a lateral acceleration Gy which is normal to the vehicle's path of motion is calculated in accordance with an equation of $Gy=V^2/R$, where "V" corresponds to a vehicle speed, and a total CFo of the cornering force is calculated in accordance with the following equation:

$$CFo = \Sigma CF = m \cdot Gy$$

where "m" corresponds to a mass of the vehicle VL. Accordingly, in the case where the sum of the cornering force CFf and the cornering force CFr is larger than the total cornering force CFo for the vehicle's cornering maneuver along the curve of the turning radius R (i.e., CFo<CFf+CFr), and the cornering force CFf of the front wheels largely exceeds the cornering force CFr of the rear wheels (i.e., CFf>>CFr), i.e., the oversteer is excessive, then the vehicle VL will be forced to turn in a direction toward the inside of the curve in the vehicle's path to cause a reduce in turning radius of the vehicle VL as shown in FIG. 20.

When the understeer is excessive during cornering, the lateral slip of the vehicle will be increased, the vehicle VL will be forced to turn in a direction toward the outside of the curve in the vehicle's path to cause an increase in turning radius of the vehicle VL as shown in FIG. 21. Thus, the excessive understeer occurs when the cornering force CFf of the front wheels is almost equal to the cornering force CFr of the rear wheels so as to be balanced with each other, or the latter is slightly larger than the former (i.e., CFf<CFr), and when the sum of the cornering force CFf and the cornering force CFr is smaller than the total cornering force CFo which is required for the vehicle's cornering maneuver along the curve of turning radius R (i.e., CFo>CFf+CFr), then the vehicle VL will be forced to turn in the direction toward the outside of the curve in the vehicle's path thereby to increase the turning radius R.

The excessive oversteer is determined on the basis of a vehicle side slip angle or vehicle slip angle β and a vehicle slip angular velocity Dβ, for example. When it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. On the other hand, the excessive understeer is determined on the basis of a difference between a desired lateral acceleration and an actual lateral acceleration, or a difference between a desired yaw rate and an actual yaw rate, for example. When it is determined that the excessive understeer occurs while a rear-drive vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above-described oversteer restraining control and understeer restraining control as a whole may be called as a steering control by braking.

In the U.S. Pat. No. 5,494,345, there is disclosed a brake control apparatus for normalizing an abnormal behavior of a vehicle by applying a braking force to each wheel. It is proposed in that publication to introduce a feedforward control to normalize the abnormal behavior of the vehicle quickly and accurately. The apparatus includes feedforward control means for producing a feedforward control signal in accordance with a target slip ratio, and mixing means for mixing the feedforward control signal with a feedback control signal indicative of a difference between the target slip ratio and the actual slip ratio and for controlling the hydraulic brake control system in accordance with the mixed control signal.

According to the apparatus disclosed in the U.S. Pat. No. 5,494,345, however, when a vehicle moves from a road of a relatively low coefficient of friction to a road of a relatively high coefficient of friction in the vehicle cornering maneuver, for example, its yaw rate will be varied rapidly to deteriorate the characteristic of the steering control for tracing the vehicle's path (abbreviated herein as a tracing control), especially in the case where the wheel located on the inside of the curve is placed on the road of the high coefficient of friction, while the wheel located on the outside of the curve is placed on the road of the low coefficient of friction. As a result, the vehicle tends to depart from the vehicle's path which is determined in accordance with the steering angle at that time. According to a conventional vehicle which is not provided with the braking force control system, nor the motion control system, if the vehicle speed is reduced, when one of its front wheels is placed on the road of the relatively high coefficient of friction, and the other of the front wheels is placed on the road of the relatively low coefficient of friction, the tracing control characteristic will be deteriorated.

SUMMARY OF THE INVENTION

Accordingly, it is an object of the present invention to provide a braking force control system for controlling a braking force applied to each wheel of a vehicle so as to avoid a rapid variation of a yaw rate of the vehicle resulted from a variation of a coefficient of friction of a road surface on which the vehicle is traveling.

In accomplishing the above and other objects, the braking force control system includes braking means which is provided for applying the braking force to each of the front and rear wheels of the vehicle at least in response to depression of a brake pedal. Desired yaw rate setting means is provided for setting a desired yaw rate in accordance with a motion of the vehicle, and actual yaw rate measuring means is provided for measuring an actual yaw rate of the vehicle. First varying rate calculation means is provided for calculating a varying rate of the desired yaw rate set by the desired yaw rate setting means. Second varying rate calculation means is provided for calculating a varying rate of the actual yaw rate measured by the actual yaw rate measuring means. Deviation calculation means is provided for calculating a deviation between the varying rate of the desired yaw rate and the varying rate of the actual yaw rate. And, limitation means is provided for actuating the braking means to limit the varying rate of the actual yaw rate by applying the braking force to at least one of the wheels, when the deviation calculated by the deviation calculation means exceeds a predetermined value.

In the braking force control system, the limitation means is preferably adapted to actuate the braking means to apply the braking force to a front wheel of the wheels located on the outside of the curve in the vehicle's path.

Preferably, the braking force control system further includes coefficient of friction estimation means for estimating a coefficient of friction of a road surface for each wheel of said vehicle placed thereon. And, the limitation means is preferably adapted to compare the estimated coefficient of friction for the front wheel located on the outside of the curve with a predetermined coefficient of friction, and actuate the braking means to apply the braking force to the front wheel located on the outside of the curve for a predetermined time, when it is determined that the coefficient of friction for the front wheel is lower than the predetermined coefficient of friction. Then, the yaw rate setting means may be adapted to set the desired yaw rate on the basis of the coefficient of friction estimated by the coefficient of friction estimation means, so that the desired yaw rate is set by the desired yaw rate setting means to be decreased in accordance with a decrease of the coefficient of friction. That is, the lower the coefficient of friction is, the lower the desired yaw rate will be set.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
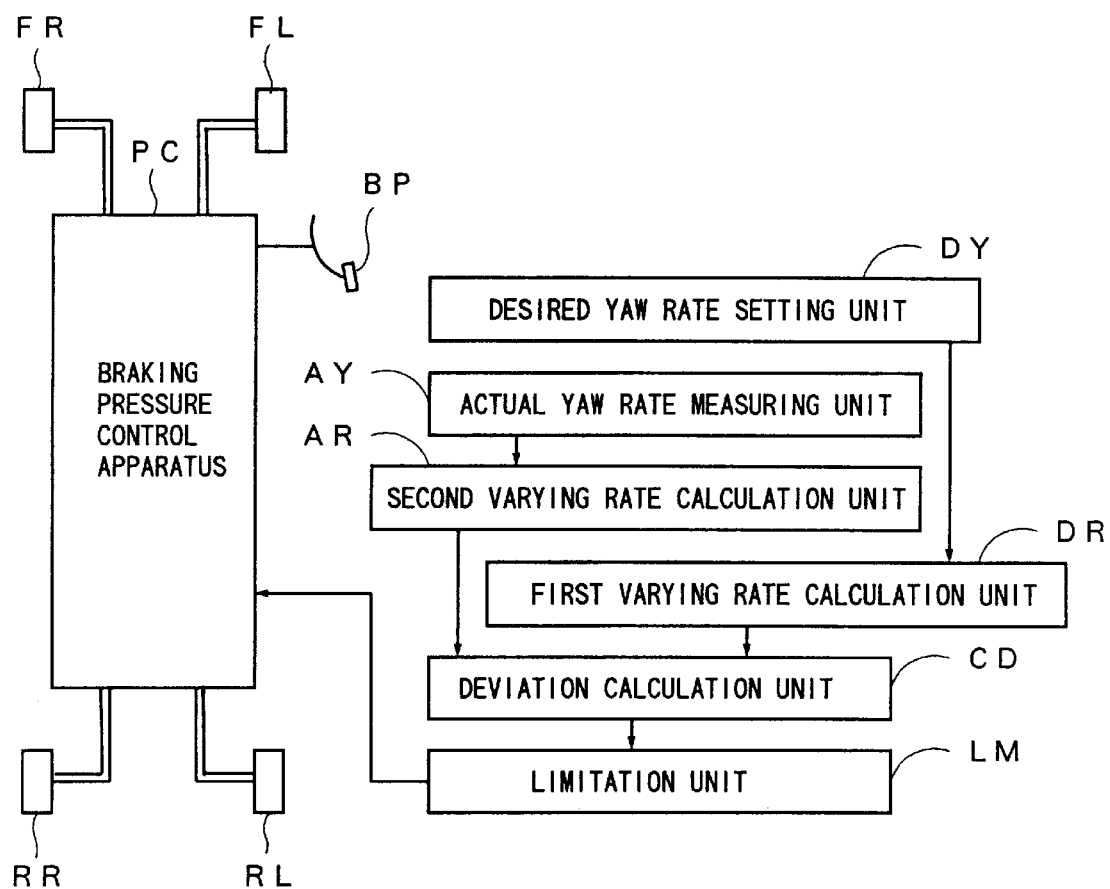
FIG. 1 is a general block diagram illustrating a braking force control system according to an embodiment of the present invention.

Referring to FIG. 1, there is schematically illustrated a braking force control system according to the present invention, which controls a braking force applied to front wheels FL, FR and rear wheels RL, RR of an automotive vehicle individually. A hydraulic braking pressure control apparatus PC is provided for applying the braking force to each wheel in response to depression of a brake pedal BP, and applying the braking force in accordance with a motion of the vehicle and irrespective of depression of the brake pedal BP. A desired yaw rate setting unit DY is provided for setting a desired yaw rate in accordance with the motion of the vehicle, and an actual yaw rate measuring unit AY is provided for measuring an actual yaw rate of the vehicle. A first varying rate calculation unit DR is provided for calculating a varying rate of the desired yaw rate set by the desired yaw rate setting unit DY. A second varying rate calculation unit AR is provided for calculating a varying rate of the actual yaw rate measured by the actual yaw rate measuring unit AY. A deviation calculation unit CD is provided for calculating a deviation between the varying rate of the desired yaw rate and the varying rate of the actual yaw rate. And, a limitation unit LM is provided for actuating the hydraulic braking pressure control apparatus PC to limit the varying rate of the actual yaw rate by applying the braking force to at least one of the wheels, when the deviation calculated by the deviation calculation unit CD exceeds a predetermined value. The limitation unit LM may be so constituted as to apply the braking force by the apparatus PC to a front wheel of the wheels which is located on the outside of a curve in the vehicle's path.

The pressure control apparatus PC may include a master cylinder which generates a hydraulic braking pressure in response to depression of the brake pedal BP, and which will be described later, and an auxiliary pressure source which has a hydraulic pump and an accumulator, and which generates the hydraulic braking pressure irrespective of depression of the brake pedal BP, even in the absence of the brake pedal input, and which will be described later. Furthermore, a motion control unit may be provided for actuating the pressure control apparatus PC to apply the braking force to at least one of the wheels in accordance with the motion of the vehicle and irrespective of the braking condition resulted from depression of the brake pedal BP, respectively. The motion of the vehicle can be determined on the basis of the wheel speeds of the wheels, vehicle lateral acceleration, yaw rate and so on, which are detected by sensors, and wheel accelerations, an estimated vehicle speed and a vehicle slip angle which are calculated on the basis of the outputs of the sensors, so that the condition of the vehicle in motion can be monitored to determine if the excessive oversteer and/or the excessive understeer occur.

Figure 2:
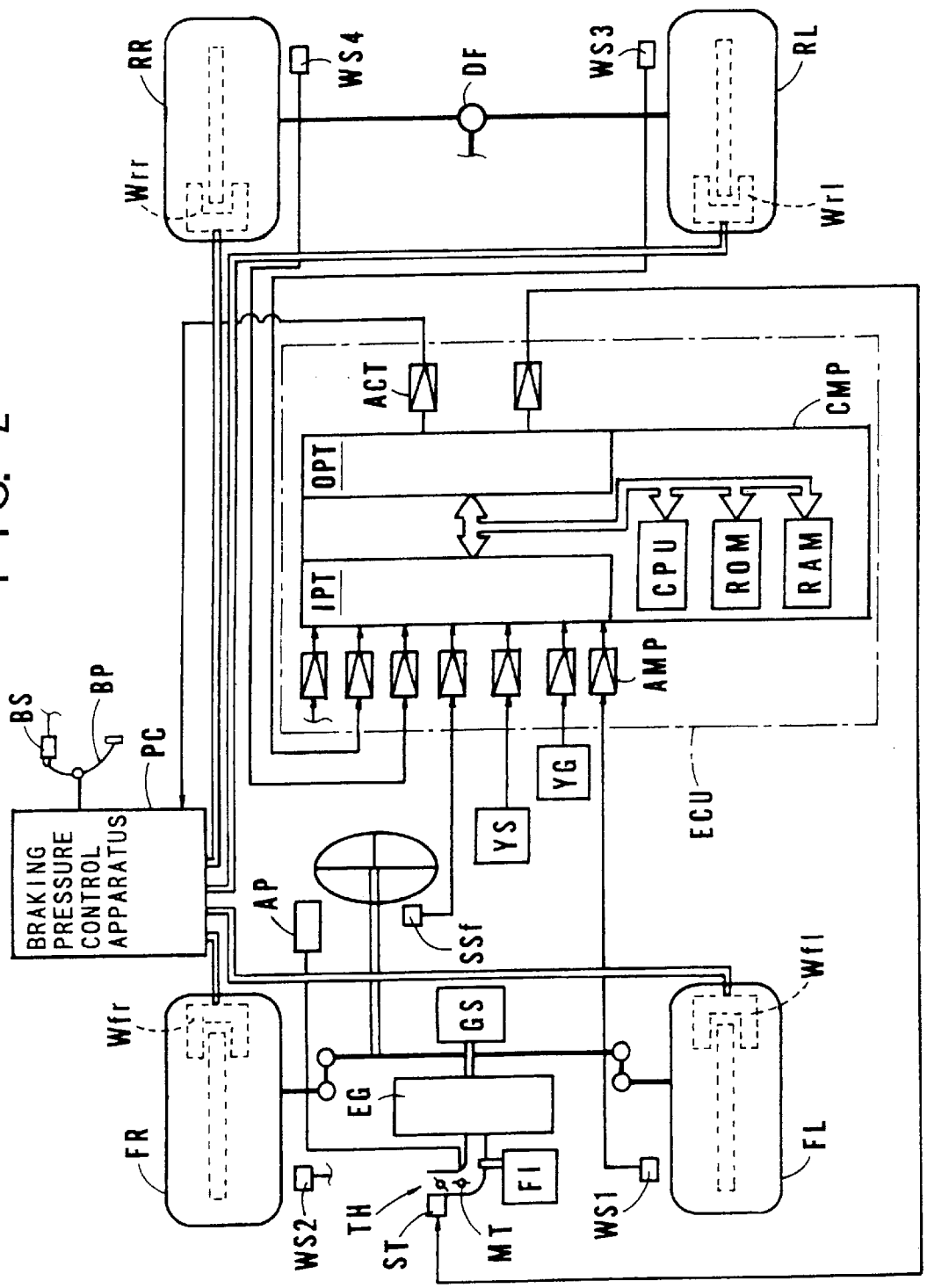
FIG. 2 is a schematic block diagram of the braking force control system of the above embodiment.

More specifically, the details of the embodiment disclosed in FIG. 1 are illustrated in FIGS. 2 to 19. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, while the present embodiment is not limited to the rear drive system.

Figure 3:
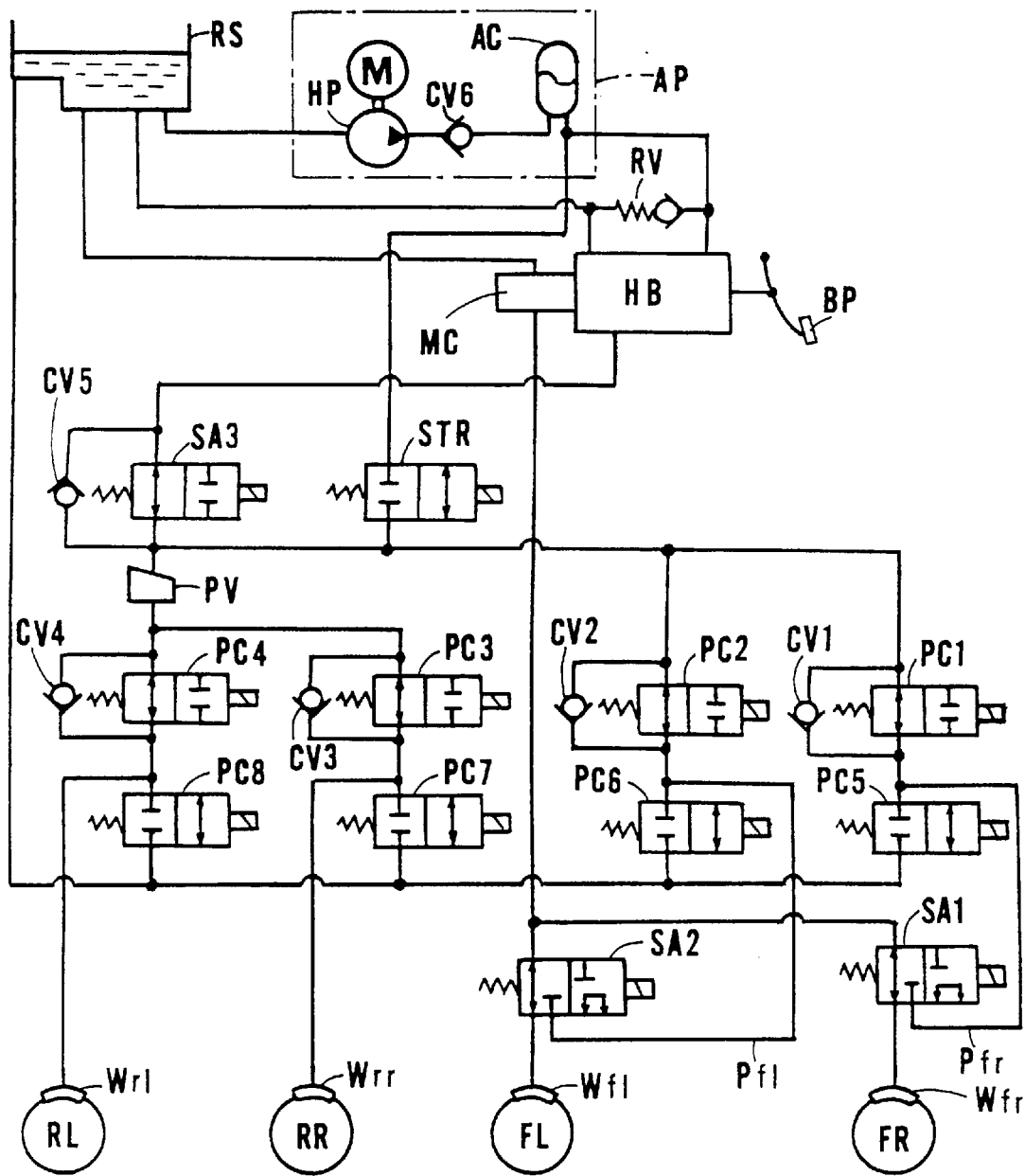
FIG. 3 is a block diagram illustrating an embodiment of a hydraulic braking pressure control apparatus for use in the above embodiment.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus PC. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. According to the present embodiment, a front-rear dual circuit system is employed, while a diagonal circuit system may be employed. The pressure control apparatus PC is arranged to be actuated in response to depression of the brake pedal BP to control the hydraulic pressure supplied to each wheel brake cylinder, and may be selected from various known types. The pressure control apparatus PC in the present embodiment may be arranged as illustrated in FIG. 3 which will be explained later in detail.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle $\delta f$ of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate $\gamma$ is detected and fed to the electronic controller ECU.

The yaw rate $\gamma$ may be calculated on the basis of a wheel speed difference Vfd between the wheel speeds of non-driven wheels (wheel speeds Vwfl, Vwfr of the front wheels FL, FR in the present embodiment), i.e., Vfd=Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 4 to 9, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

FIG. 3 shows an embodiment of the hydraulic braking pressure control apparatus PC which includes a master cylinder MC and a hydraulic booster HB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wfr and etc., a solenoid valve SA3, solenoid valves PC1–PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 3 to form the front and rear dual circuit system according to the present embodiment.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 3, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1–PC8 are controlled by the electronic controller ECU to provide various control modes for controlling the stability of the vehicle, such as the steering control by braking, anti-skid control, and other various control modes. For example, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized, the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the oversteer restraining control and/or the understeer restraining control can be performed, as noted previously.

Figure 4:
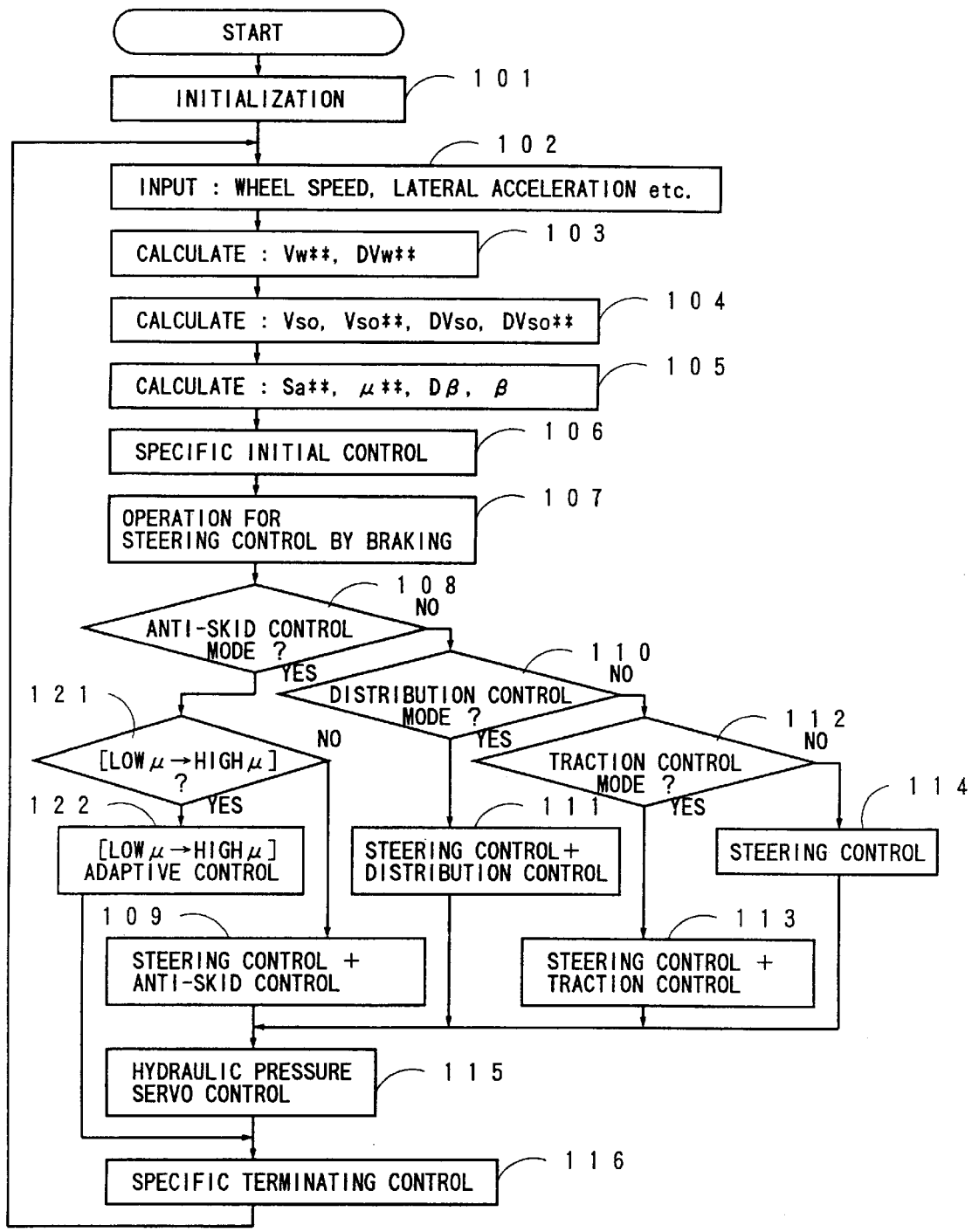
FIG. 4 is a flowchart showing a main routine of the braking force control according to the above embodiment.

According to the present embodiment as constituted above, a program routine for the vehicle motion control including the steering control by braking, anti-skid control and so on is executed by the electronic controller ECU, as will be described hereinafter with reference to FIGS. 4 to 9. The program routine starts when an ignition switch (not shown) is turned on. At the outset, the program for the vehicle motion control as shown in FIG. 4 provides for initialization of the system at Step 101 to clear various data. At Step 102, the signals detected by the wheel speed sensors WS1 to WS4 are read by the electronic controller ECU, and also read are the signal (steering angle δf) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw of each wheel is calculated ( represents one of the wheels FL, FR, RL, RR), and differentiated to produce the wheel acceleration DVw of each wheel. Next, at Step 104, an estimated vehicle speed Vso at the gravity center of the vehicle is calculated (Vso=MAX[Vw]), and an estimated vehicle speed Vso for each wheel is calculated, respectively, on the basis of the wheel speed Vw. And, the estimated vehicle speeds Vso and Vso are differentiated to provide a longitudinal vehicle acceleration DVso at the gravity center and a longitudinal vehicle acceleration DVso of each wheel, respectively. The estimated vehicle speed Vso may be normalized to reduce the error caused by a difference between the wheels located on the inside and outside of the curve while cornering. That is, the estimated and normalized vehicle speed NVso is calculated in accordance with the following equation:

$$NVso^{}=Vso^{}(n)-\Delta Vr(n)$$

where $\Delta Vr^{}(n)$ is a correction factor provided for correction during cornering, as follows: That is, the correction factor $\Delta Vr^{}(n)$ set on the basis of a turning radius R and $\gamma$. VsoFW (FW represents front wheels) which is nearly equal to the lateral acceleration Gya, according to a map (not shown) provided for each wheel except for a reference wheel. If $\Delta VrFL$ is employed as a reference value for example, it is set to be zero. Then, $\Delta VrFR$ is set according to a map provided for the difference between two wheels located on the inside and outside of the curve during cornering. With respect to the rear wheels, $\Delta VrRL$ is set according to a map provided for the difference between two wheels both located on the inside of the curve during cornering, while $\Delta VrRR$ is set according to a map provided for the difference between two wheels both located on the outside of the curve during cornering, and also according to the map provided for the difference between two wheels located on the inside and the outside of the curve during cornering.

The program further proceeds to Step 105, where an actual slip rate Sa is calculated on the basis of the wheel speed Vw for each wheel and the estimated vehicle speed Vso (or, the estimated and normalized vehicle speed NVso**) which are calculated at Steps 103 and 104, respectively, in accordance with the following equation:

$$Sa^{}=(Vso-Vw^{})/Vso$$

On the basis of the vehicle acceleration DVso and the actual lateral acceleration Gya detected by the lateral acceleration sensor YG, the coefficient of friction $\mu^{}$ of a road surface for each wheel can be calculated in accordance with the following equation:

$$\mu^{}\approx(DVso^{2}+Gya^2)^{1/2}$$

In order to detect the coefficient of friction of the road surface, various methods may be employed other than the above method, such as a sensor for directly detecting the coefficient of friction of the road surface, for example.

Also, at Step 105, a vehicle slip angle $\beta$ which corresponds to a vehicle slip against the vehicle's path of motion, can be estimated as follows. That is, at the outset, the vehicle slip angular velocity $D\beta$, which is a differentiated value of the vehicle slip angle $\beta$, is calculated in accordance with the following equation:

$$D\beta=Gy/Vso-\gamma$$

where "Gy" is the lateral acceleration of the vehicle, "Vso" is the estimated vehicle speed of the vehicle measured at its gravity center, and "$\gamma$" is the yaw rate. Then, the vehicle slip angle $\beta$ is calculated in accordance with the following equation:

$$\beta=\int D\beta dt$$

The vehicle slip angle $\beta$ may be calculated in accordance with the following equation:

$$\beta=\tan^{-1}(Vy/Vx)$$

where "Vx" is a longitudinal vehicle speed, and "Vy" is a lateral vehicle speed.

Then, the program proceeds to Step 106 where a specific initial control for providing initial pressure is performed, and then to Step 107 where an operation for the steering control by braking is made to provide a desired slip rate for use in the steering control by braking, wherein the braking force applied to each wheel is controlled at Step 114 through the hydraulic pressure servo control which will be performed later at Step 115, so that the pressure control apparatus PC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 108, where it is determined whether the condition for initiating the anti-skid control is fulfilled or not. If it is determined at Step 108 that the condition is in the anti-skid control mode, and it is determined at Step 121 that a condition which will be explained later is not fulfilled, the specific initial control is terminated immediately at Step 109, where a control mode performing both the steering control by braking and the anti-skid control start.

If it is determined at Step 108 that the condition for initiating the anti-skid control has not been fulfilled, then the program proceeds to Step 110 where it is determined whether the condition for initiating the front and rear braking force distribution control is fulfilled or not. If it is affirmative at Step 110, the program further proceeds to Step 111 where a control mode for performing both the steering control by braking and the braking force distribution control is performed, otherwise it proceeds to Step 112, where it is determined whether the condition for initiating the traction control is fulfilled or not. If the condition for initiating the traction control is fulfilled, the program proceeds to Step 113 where a control mode for performing both the steering control by braking and the traction control is performed. Otherwise, a control mode for performing only the steering control by braking is set at Step 114. On the basis of the control modes as set in the above, the hydraulic pressure servo control is performed at Step 115, then the program proceeds to Step 116 where a specific terminating control is performed, and then the program returns to Step 102. In accordance with the control modes set at Steps 109, 111, 113, 114, the sub-throttle opening angle for the throttle control apparatus TH may be adjusted in response to the condition of the vehicle in motion, so that the output of the engine EG could be reduced to limit the driving force produced thereby.

If it is determined at Step 108 that the condition for initiating the anti-skid control has been fulfilled, then the program proceeds to Step 121 where it is determined whether all of such conditions have been fulfilled, or not, (1) that a wheel to be controlled (abbreviated as a controlled wheel) is placed on a road of a relatively low coefficient of friction (low $\mu$), (2) that the tracing control which will be described later in detail is being performed, (3) that a wheel located at the opposite side to the controlled wheel (abbreviated as a symmetric wheel) is placed at a relatively high coefficient of friction (high μ), and (4) that a predetermined time Tz has not been lapsed after the anti-skid control started. If the result is affirmative, the program proceeds to Step 122, where an adaptive control for the vehicle which moved from the road of the low μ to the road of the high μ is performed, which will be explained later in detail with reference to FIG. 9.

According to the above-described anti-skid control mode, the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to prevent the driven wheel from slipping during the vehicle driving operation.

Figure 5:
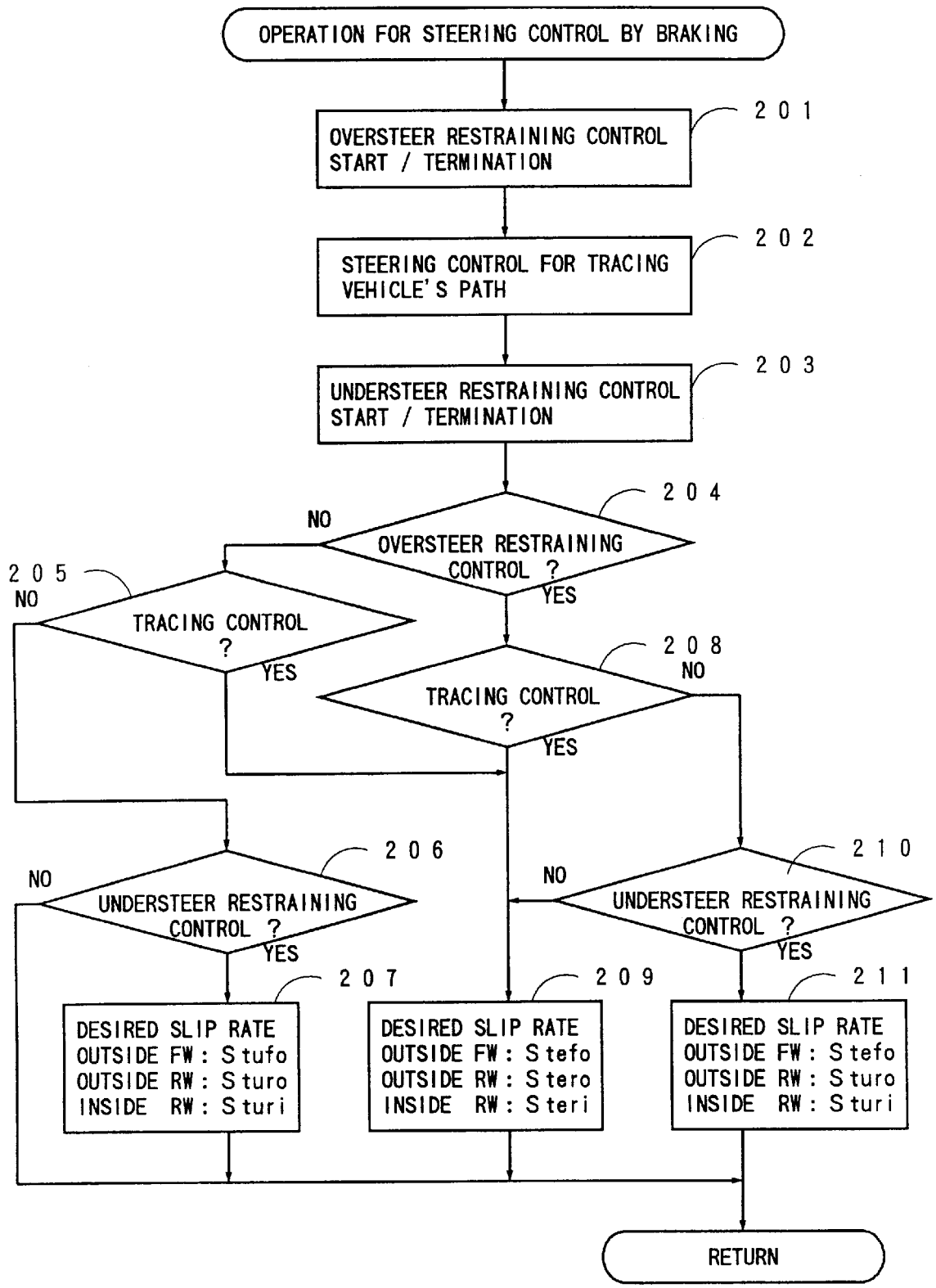
FIG. 5 is a flowchart showing a sub-routine of a steering control by braking according to the above embodiment.
Figure 10:
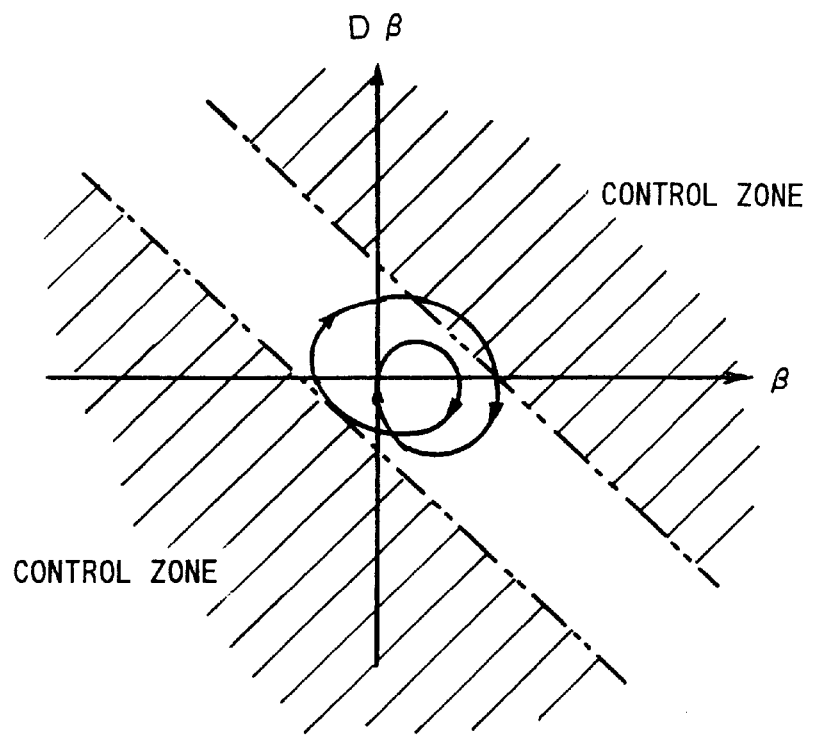
FIG. 10 is a diagram showing a region for determining start and termination of the oversteer restraining control according to above embodiment.
Figure 11:
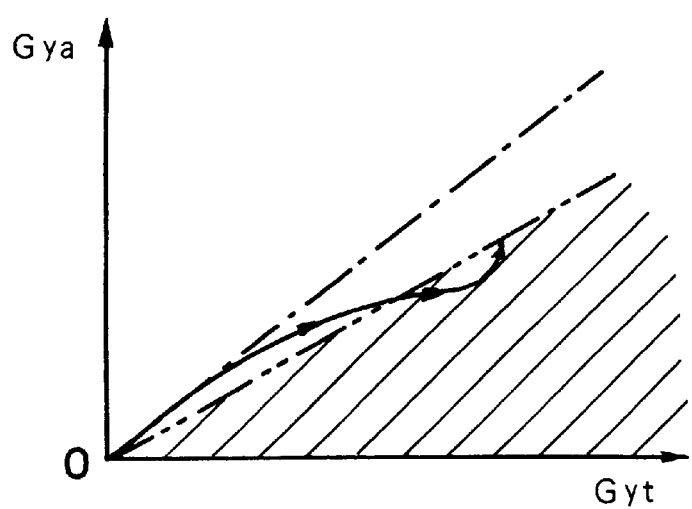
FIG. 11 is a diagram showing a region for determining start and termination of the understeer restraining control according to above embodiment.

FIG. 5 shows a flowchart for setting desired slip rates which are to be provided at Step 107 in FIG. 4 for the operation of the steering control by braking, which includes the oversteer restraining control and the understeer restraining control. Through this flowchart, therefore, the desired slip rates are set in accordance with the oversteer restraining control and/or the understeer restraining control. At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β–Dβ plane as shown in FIG. 10. That is, if the vehicle slip angle β and the vehicle slip angular velocity Dβ which are calculated when determining the start or termination, are fallen within the control zone, the oversteer restraining control will be started. However, if the Dβ come to be out of the control zone, the oversteer restraining control will be controlled as indicated by the arrow in FIG. 10 thereby to be terminated. And, the braking force applied to each wheel is controlled in such a manner that the farther they remote from the boundary between the control zone and non-control zone (as indicted by two dotted chain line in FIG. 10) toward the control zone, the more the amount to be controlled will be provided.

Next, at Step 202, the steering control for tracing the vehicle's path (i.e., tracing control) is performed, which will be explained later with reference to FIG. 8. Then, the program proceeds to Step 203, where the determination of the start and termination is made on the basis of the determination whether it is within a control zone indicated by hatching in FIG. 11. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 11 thereby to be terminated.

Then, the program proceeds to Step 204 where it is determined whether the oversteer restraining control is to be performed or not. If the oversteer restraining control is not to be performed, the program proceeds to Step 205 where the tracing control is to be performed or not. If the result is negative, the program further proceeds to Step 206 where it is determined whether the understeer restraining control is to be performed or not. In the case where the understeer restraining control is not to be performed, the program returns to the main routine. In the case where it is determined at Step 206 that the understeer restraining control is to be performed, the program proceeds to Step 207 where the desired slip rate of each wheel is set to a desired slip rate which is provided for use in the understeer restraining control. If it is determined at Step 204 that the oversteer restraining control is to be performed, the program proceeds to Step 208 where it is determined whether the steering control for tracing the vehicle's path is to be performed, or not. If the result is negative, the program proceeds to Step 210 where it is determined whether the understeer restraining control is to be performed or not. In the case where the understeer restraining control is not to be performed, the program proceeds to Step 209 where the desired slip rate of each wheel is set to a desired slip rate which is provided for use in the oversteer restraining control. Also, if it is determined at Steps 205 and 208 that the steering control for tracing the vehicle's path is to be performed, the program proceeds to Step 209 where the desired slip rate of each wheel is set to a desired slip rate which is provided for use in the oversteer restraining control. In the case where it is determined at Step 210 that the understeer restraining control is to be performed, the program proceeds to Step 211 where the desired slip rate of each wheel is set to a desired slip rate which is provided for use in both of the oversteer restraining control and the understeer restraining control.

With respect to the desired slip rate for use in the oversteer restraining control performed at Step 207, the vehicle slip angle β and the vehicle slip angular velocity Dβ are employed. With respect to the desired slip rate for use in the understeer restraining control, a difference between the desired lateral acceleration Gyto and the actual acceleration Gya is employed. The calculation of the desired lateral acceleration Gyto will be explained later with reference to FIG. 8.

At Step 207, the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured value indicated by "a" as described later. "u" indicates the understeer restraining control, "r" indicates the rear wheel, "o" indicates the outside of the curve, and "i" indicates the inside of the curve, respectively. At Step 209, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control. As noted previously, "FW" indicates a front wheel and "RW" indicates a rear wheel.

At Step 211, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$Stefo = K1 \cdot \beta + K2 \cdot D\beta$$

$$Stero = K3 \cdot \beta + K4 \cdot D\beta$$

$$Steri = K5 \cdot \beta + K6 \cdot D\beta$$

where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$$Stufo = K7 \cdot \Delta Gy$$

$$Sturo = K8 \cdot \Delta Gy$$

$$Sturi = K9 \cdot \Delta Gy$$

where K7 is a constant for providing the desired slip rate Stufo which is used for increasing the braking pressure (or, alternatively decreasing the braking pressure), while K8 and K9 are constants for providing the desired slip rates Sturo, Sturi both of which are used for increasing the braking pressure.

Figure 6:
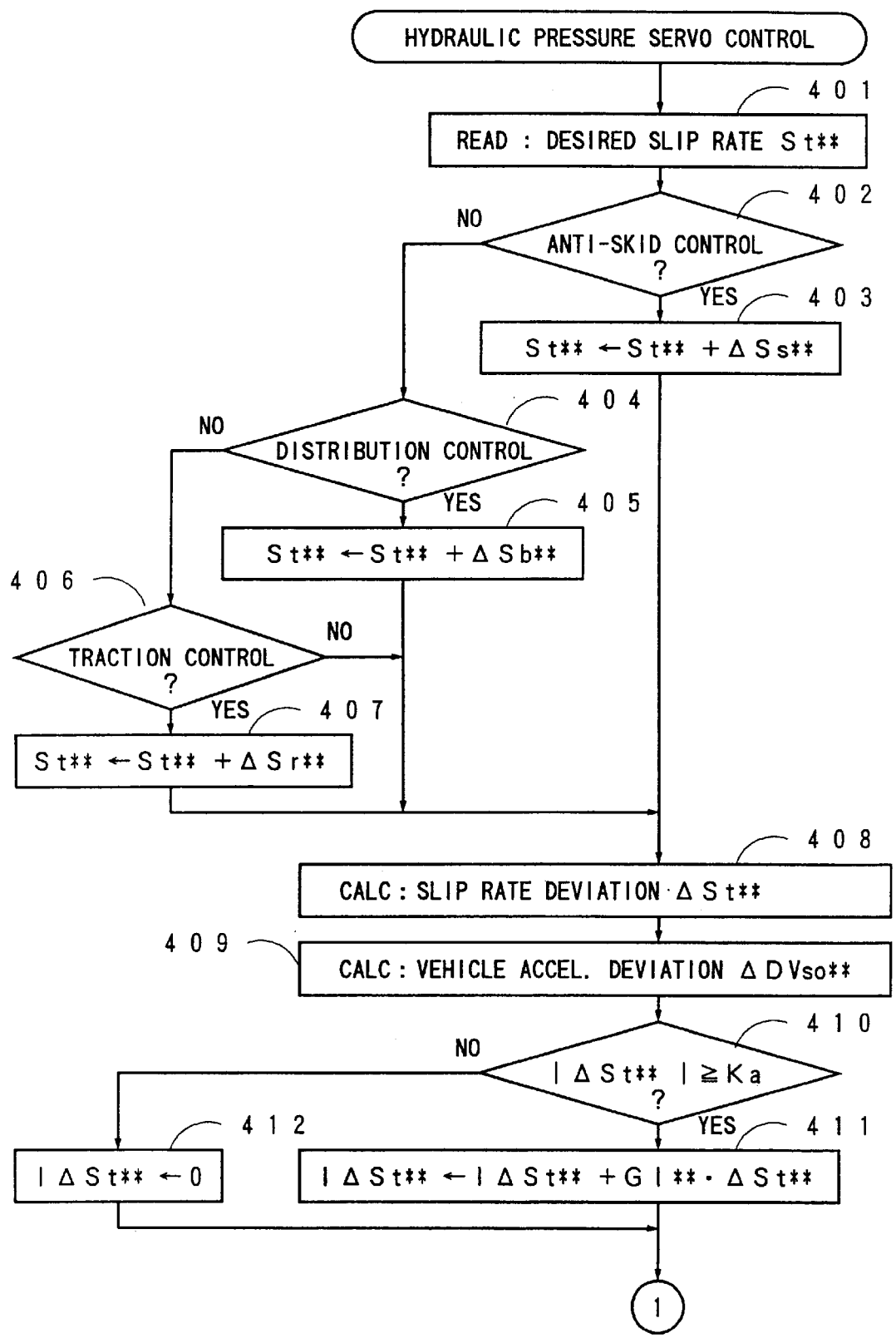
FIG. 6 is a flowchart showing a hydraulic pressure servo control according to the above embodiment.
Figure 7:
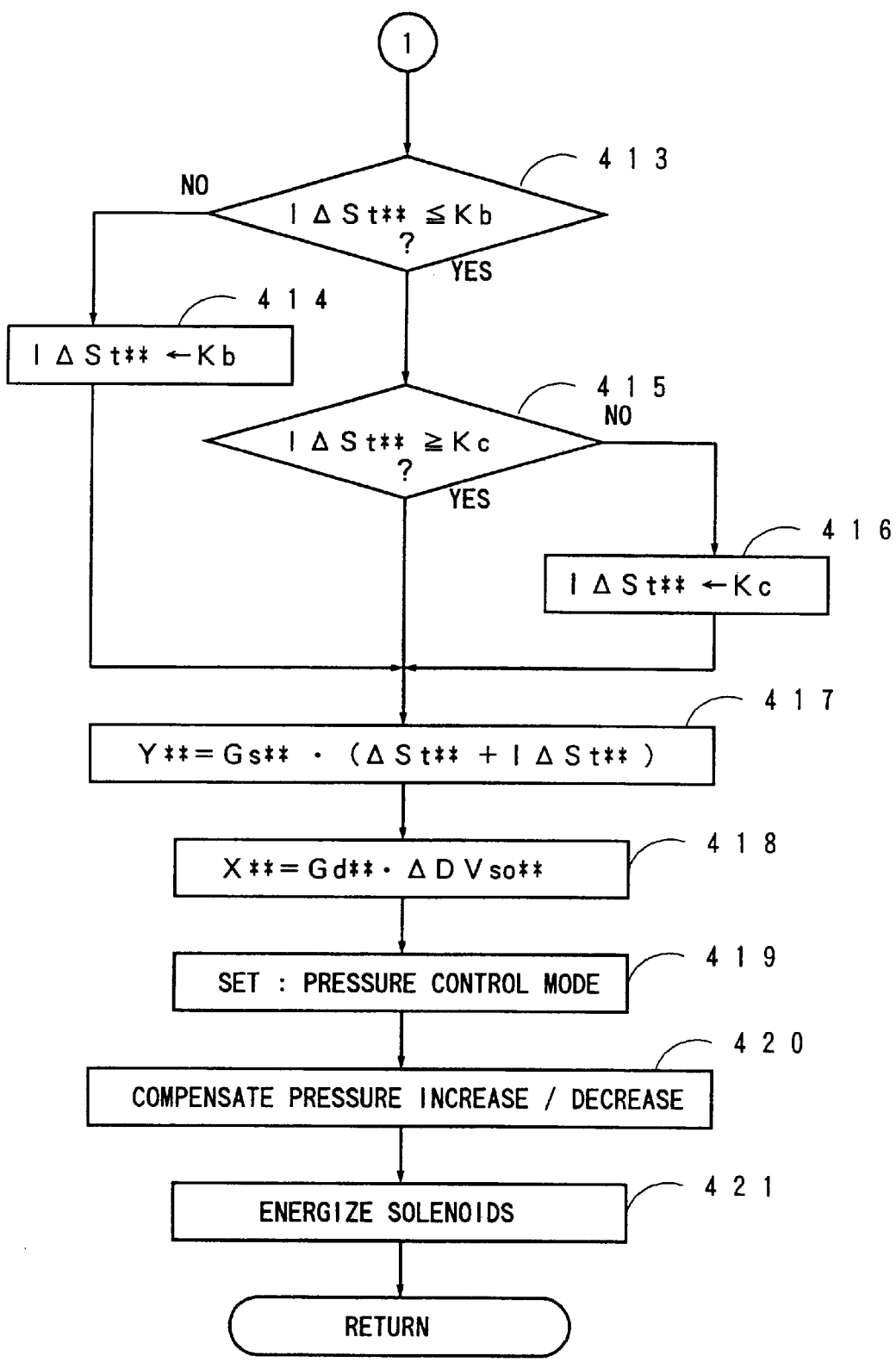
FIG. 7 is a flowchart showing a hydraulic pressure servo control according to the above embodiment.

FIGS. 6 and 7 show the hydraulic pressure servo control which is executed at Step 115 in FIG. 4, and wherein the wheel cylinder pressure for each wheel is controlled through the slip rate servo control. At Step 401, the desired slip rates St, which are set at Step 207, 209 or 211, are read at Step 401 to provide the desired slip rate for each wheel of the vehicle. Then, the program proceeds to Step 402 where it is determined whether the anti-skid control is to be performed. If the result is affirmative, the program proceeds to Step 403 where a correction value ΔSs is added to the desired slip rate St for the anti-skid control to renew the desired slip rate St. If the result is negative at Step 402, the program proceeds to Step 404 where it is determined whether the front-rear braking force distribution control is to be performed. If the result is affirmative at Step 404, the program proceeds to Step 405 where a correction value ΔSb is added to the desired slip rate St for the braking force distribution control to renew the desired slip rate St. If the result is negative at Step 404, the program proceeds to Step 406 where it is determined whether the traction control is to be performed. If the result is affirmative at Step 406, the program proceeds to Step 407 where a correction value ΔSr is added to the desired slip rate St for the traction control to renew the desired slip rate St. Thus, after the desired slip rate St is renewed at Steps 403, 405, 407, or as it is if it is determined that the traction control is not to be performed, the program proceeds to Step 408, where a slip rate deviation ΔSt is calculated for each wheel, and further proceeds to Step 409 where a vehicle acceleration deviation ΔDVso** is calculated.

At Step 408, the difference between the desired slip rate St and the actual slip rate Sa is calculated to provide the slip rate deviation ΔSt (i.e., ΔSt=St−Sa). And, at Step 409, the difference between the vehicle acceleration DVso of a wheel to be controlled and that of a reference wheel (i.e., a wheel not to be controlled) is calculated to provide the vehicle acceleration deviation ΔDVso. The actual slip rate Sa and the vehicle acceleration deviation ΔDVso may be calculated in accordance with a specific manner which is determined in dependence upon the control modes such as the anti-skid control mode, traction control mode, or the like.

Then, the program proceeds to Step 410 where the slip rate deviation ΔSt is compared with a predetermined value Ka. If an absolute value of the slip rate deviation|ΔSt| is equal to or greater than the predetermined value Ka, the program proceeds to Step 411 where an integrated value (I ΔSt) of the slip rate deviation ΔSt is renewed. That is, a value of the slip rate deviation ΔSt multiplied by a gain GI is added to the integrated value of the slip rate deviation IΔSt obtained at the previous cycle to provide the integrated value of the slip rate deviation IΔSt at the present cycle. If the absolute value of the slip rate deviation |ΔSt| is smaller than the predetermined value Ka, the program proceeds to Step 412 where the integrated value of the slip rate deviation IΔSt is cleared to be zero (0). Then, the program proceeds to Steps 413 to 416 as shown in FIG. 7 where the slip rate deviation IΔSt is limited to a value which is equal to or smaller than an upper limit value Kb, or which is equal to or greater than a lower limit value Kc. If the slip rate deviation IΔSt is greater than the upper limit Kb, it is set to be the value Kb at Step 414, whereas if the slip rate deviation IΔSt** is smaller than the lower limit Kc, it is set to be the value Kc at Step 416.

Figure 12:
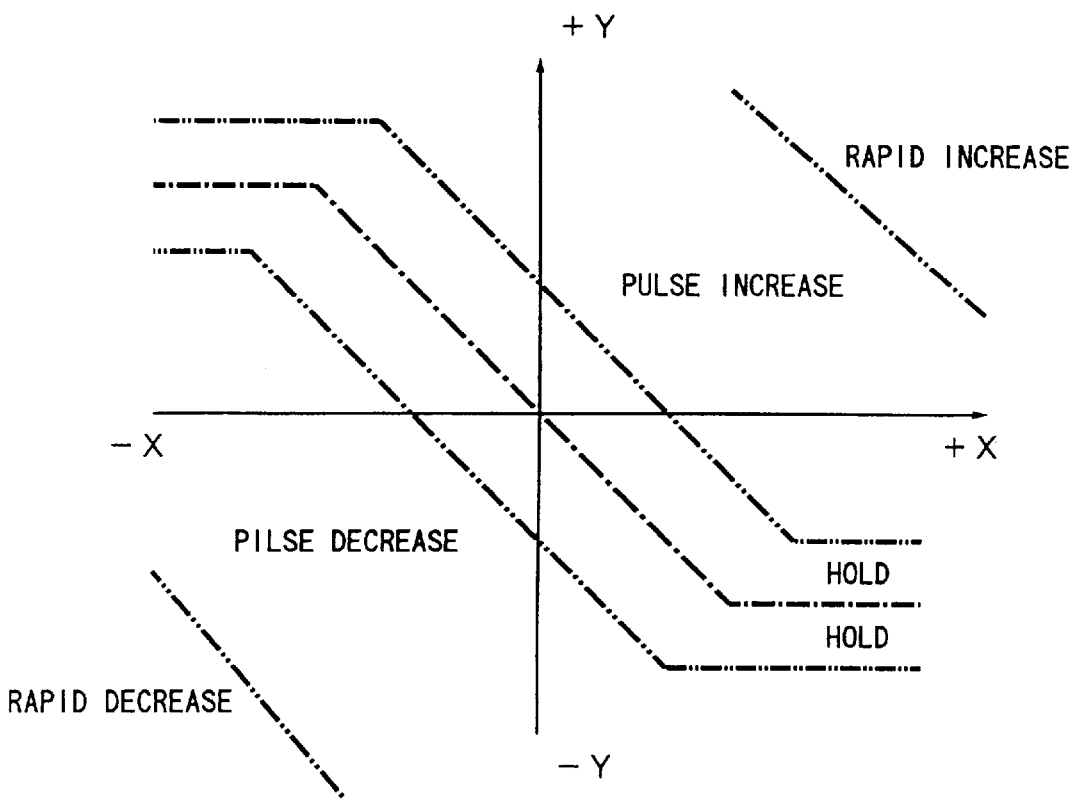
FIG. 12 is a diagram showing the relationship between the pressure control modes and parameters for use in the hydraulic braking pressure control according to the above embodiment.
Figure 13:
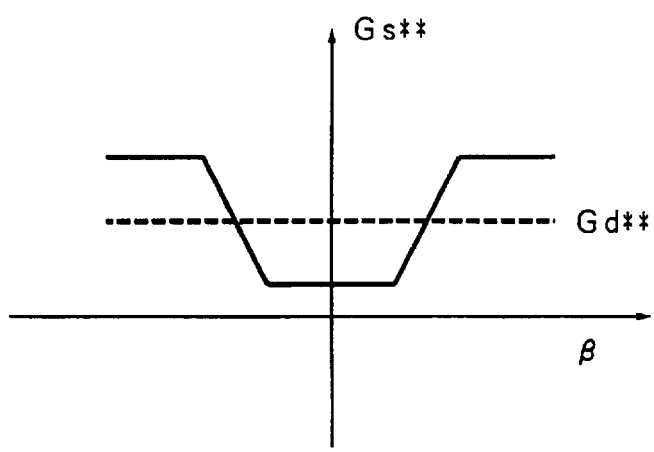
FIG. 13 is a diagram showing the relationship between a vehicle slip angle and a gain for calculating the parameters according to the above embodiment.

Thereafter, the program proceeds to Step 417 where a parameter Y** for providing a hydraulic pressure control in each control mode is calculated in accordance with the following equation:

$$Y^{} = Gs^{} \cdot (\Delta St^{} + I\Delta St^{})$$

where "Gs" is a gain, which is provided in response to the vehicle slip angle β and in accordance with a diagram as shown by a solid line in FIG. 13. The program further proceeds to Step 418 where another parameter X is calculated in accordance with the following equation:

$$X^{} = Gd^{} \cdot \Delta DVso^{**}$$

where "Gd" is a gain which is a constant value as shown by a broken line in FIG. 13. On the basis of the parameters X and Y, a pressure control mode for each wheel is provided at Step 419, in accordance with a control map as shown in FIG. 12. The control map has a rapid pressure decreasing zone, a pulse pressure decreasing zone, a pressure holding zone, a pulse pressure increasing zone, and a rapid pressure increasing zone which are provided in advance as shown in FIG. 12, so that any one of the zones is selected in accordance with the parameters X and Y** at Step 419. In the case where no control mode is performed, no pressure control mode is provided (i.e., solenoids are off).

At Step 420, is performed a pressure increase and decrease compensating control, which is required for smoothing the first transition and last transition of the hydraulic pressure, when the presently selected zone is changed from the previously selected zone at Step 419, e.g., from the pressure increasing zone to the pressure decreasing zone, or vice versa. When the zone is changed from the rapid pressure decreasing zone to the pulse pressure increasing zone, for instance, a rapid pressure increasing control is performed for a period which is determined on the basis of a period during which a rapid pressure decrease mode, which was provided immediately before the rapid pressure increasing control, lasted. Finally, the program proceeds to Step 421 where the solenoid of each valve in the hydraulic pressure control apparatus PC is energized or de-energized in accordance with the mode determined by the selected pressure control zone or the pressure increase and decrease compensating control thereby to control the braking force applied to each wheel.

Figure 8:
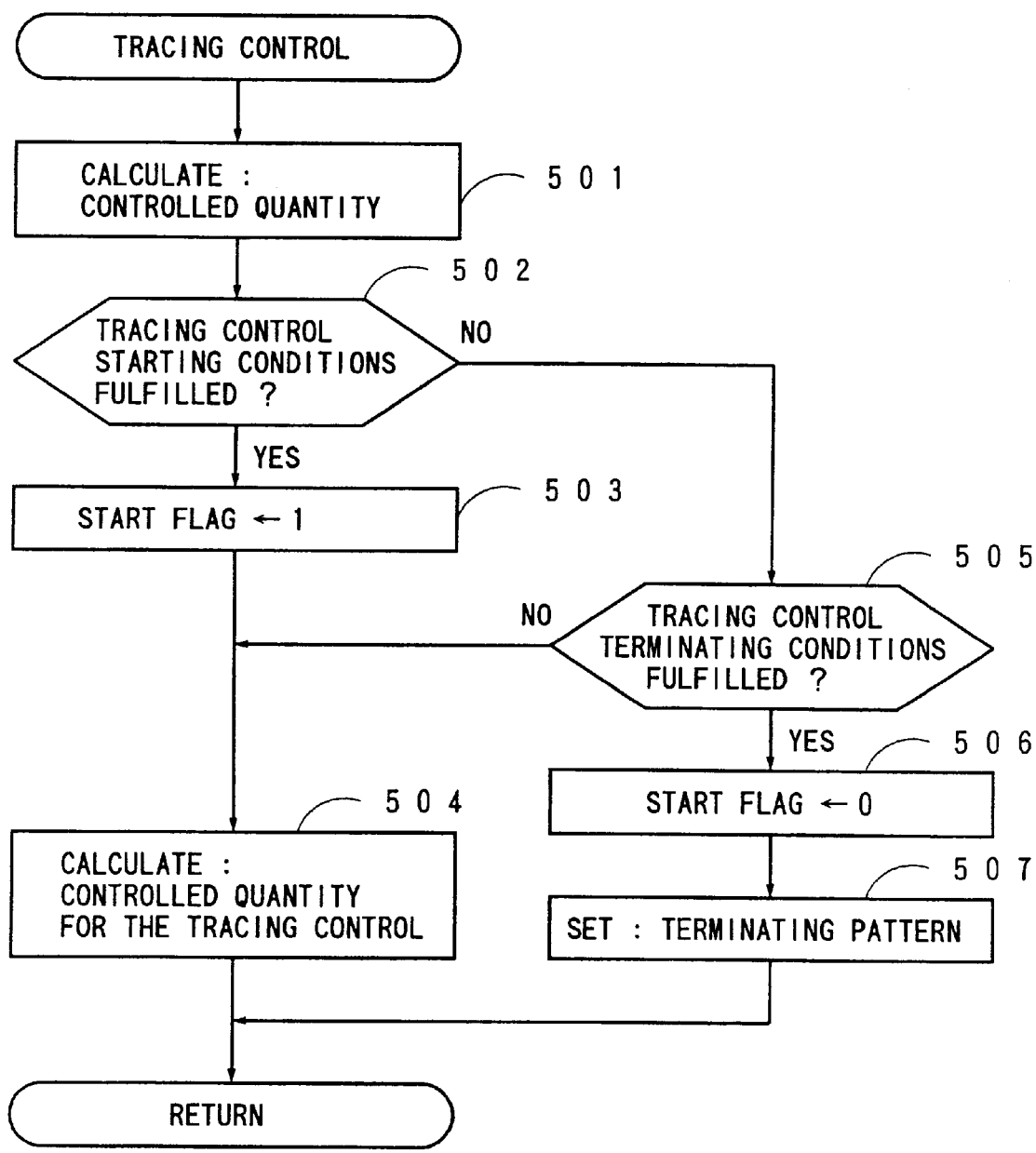
FIG. 8 is a flowchart showing a steering control for tracing a vehicle's path according to the above embodiment.

FIG. 8 shows the operation of the tracing control performed at Step 202 in FIG. 5. At Step 501, a steered angle θf with a time-lag of first order applied to the steering angle θfo is obtained, in accordance with the following equation (1);

$$\theta f = \frac{\theta fo}{1 - \tau \cdot S} \quad (1)$$

Then, the desired lateral acceleration Gyto is calculated in accordance with the following equation (2);

$$Gyto = \frac{Vso^2}{1 + Kh \cdot Vso^2} \cdot \frac{\theta f}{N \cdot L} = \frac{Vso^2}{Kf} \cdot \theta f \quad (2)$$

where "Kh" is a stability factor (e.g., 0.0012), "N" is a steering gear ratio, and "L" is a wheel base of the vehicle. By differentiating the desired lateral acceleration Gyto, the varying rate of the desired lateral acceleration DGyto can be obtained according to the following equation (3);

$$DGyto = \frac{Vso^2}{Kf} \cdot \frac{d\theta f}{dt} \quad (3)$$

Figure 14:
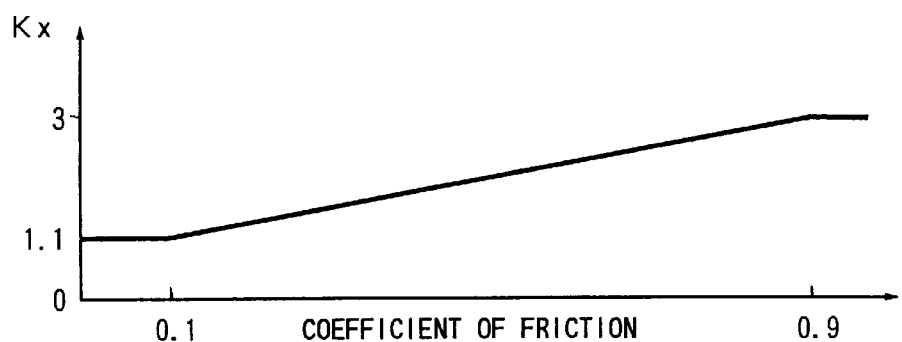
FIG. 14 is a diagram showing the relationship between a coefficient of friction and a factor for calculating a varying rate of a lateral acceleration according to above embodiment.
Figure 15:
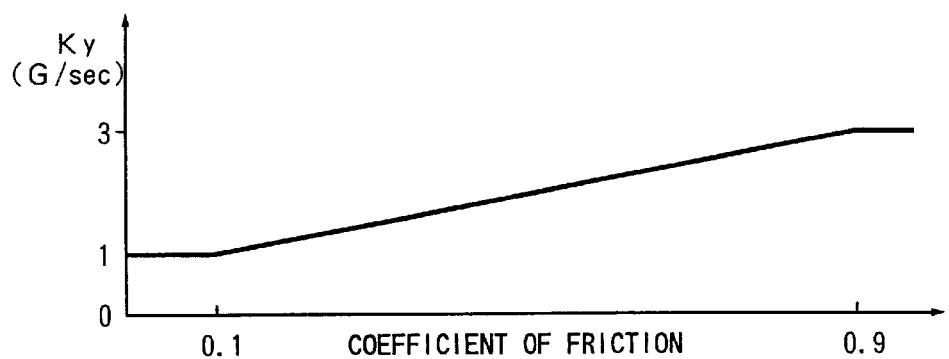
FIG. 15 is a diagram showing the relationship between a coefficient of friction and a factor for calculating a varying rate of a lateral acceleration according to above embodiment.
Figure 16:
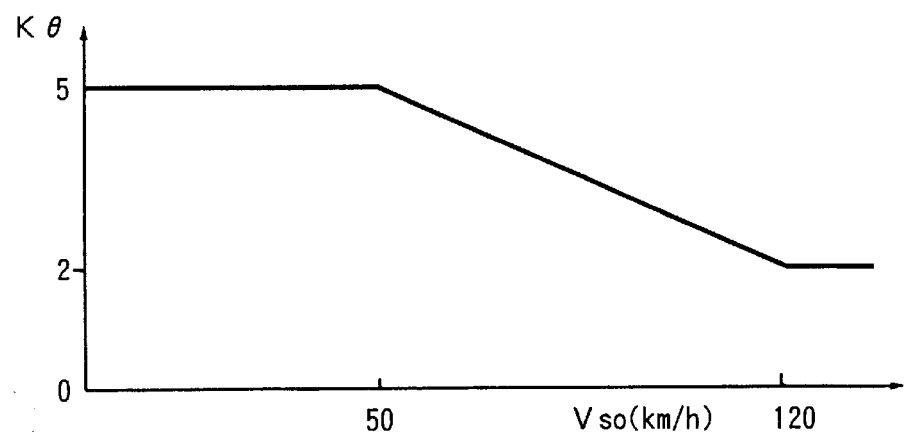
FIG. 16 is a diagram showing the relationship between an estimated vehicle speed and a reference steering angle of a steering wheel according to above embodiment.

Then, the varying rate of the lateral acceleration DGyt for use in the actual control, which corresponds to the value differentiated the desired lateral acceleration Gyto, is calculated in accordance with the following equation (4);

$$DGyt = Kx \cdot DGyto + Ky \quad (4)$$

where "Kx" and "Ky" are the values set in response to the coefficient of friction of the road surface μ, and in accordance with the relationships as shown in FIGS. 14, 15.

As a result, the varying rate of the lateral acceleration DGyt is set to be such a value that a predetermined varying rate was added to the desired lateral acceleration Gyto in advance, thereby to maintain the vehicle stability even in case of so called μ-jump, wherein the coefficient of friction (μ) of the road surface is rapidly varied.

Accordingly, the lateral acceleration deviation ΔGy is calculated in accordance with the following equation (5), and the deviation ΔDGy of the varying rate of the lateral acceleration is calculated according to the following equation (6), respectively;

$$\Delta Gy = Vso \cdot \gamma - Gyt \quad (5)$$

$$\Delta DGy = Vso \cdot \frac{d\gamma}{dt} - DGyt \quad (6)$$

where "Vso·γ" corresponds to the actual lateral acceleration Gya, and "Vso·dγ/dt" corresponds to the varying rate ΔGya of the actual lateral acceleration Gya.

At Step 502, it is determined on the basis of the values obtained as described above whether the tracing control is to be initiated. When such starting conditions that (1) the steering operation is being made (i.e., θf/N>Kθ is satisfied, where Kθ is set according to FIG. 16), (2) the deviation ΔDGy of the varying rate of the lateral acceleration is caused (i.e., sine (Gyto)·ΔDGy>0 is satisfied), and (3) the vehicle is being steered in the same direction as the rotation of the steering wheel (i.e., Gyto·Gya>0 is satisfied) have been satisfied for a predetermined time T1 (e.g., 0.1 sec), the tracing control will be initiated.

Figure 19:
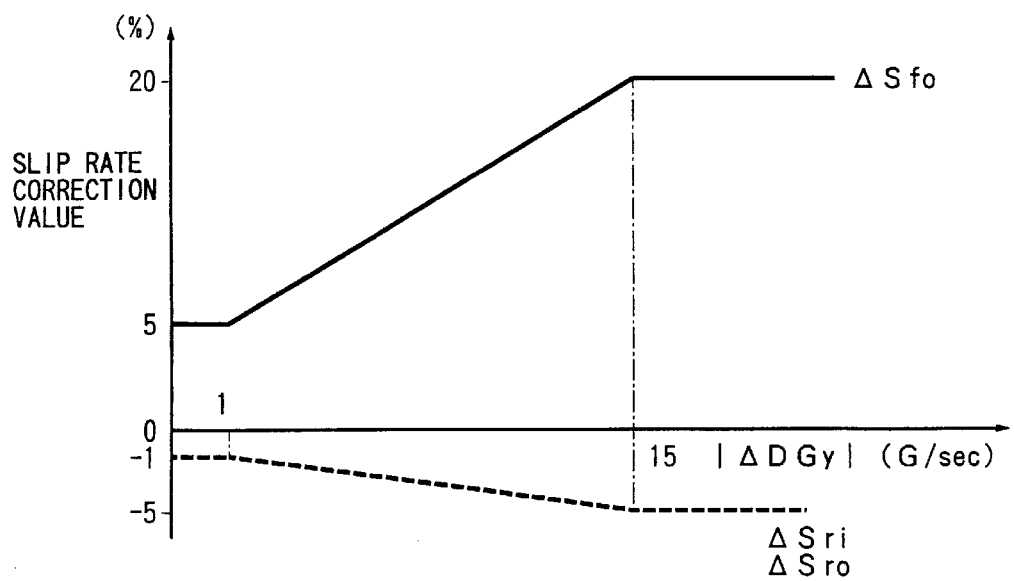
FIG. 19 is a diagram showing the relationship between a correction value to a desired slip rate and a varying rate of a lateral acceleration according to above embodiment.
Figure 20:
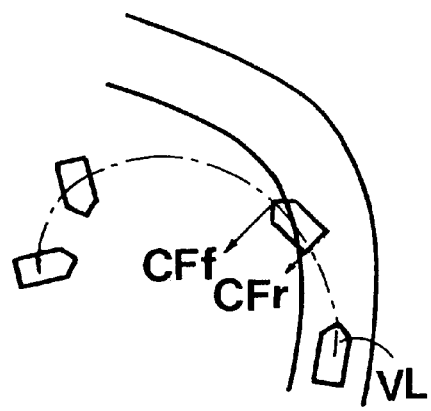
FIG. 20 is a drawing illustrating a state where an excessive oversteer occurs while a conventional vehicle is turning to the left.
Figure 21:
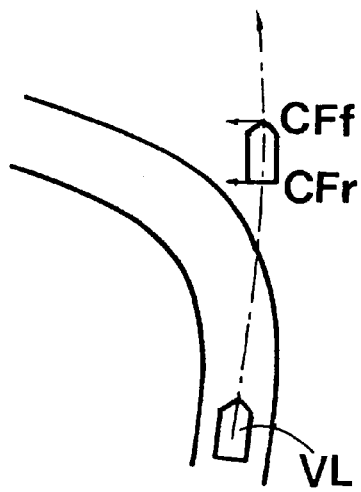
FIG. 21 is a drawing illustrating a state where an excessive understeer occurs while the conventional vehicle is turning to the left.

If it is determined at Step 502 that the conditions for starting the tracing control have been fulfilled, the program proceeds to Step 503 where a start flag of the tracing control is set, then proceeds to Step 504 where the controlled values of the tracing control are obtained in the form of the correction values ΔSfo, ΔSro, ΔSri to the desired slip rates as shown in FIG. 19, so that they are corrected at Step 209 in FIG. 5. That is, the correction values ΔSfo, ΔSro, ΔSri are added to the desired slip rates Stefo, Stero, Steri which are set at Step 209, respectively. FIG. 19 shows the conditions only for the braking operation of the vehicle, which are different from the conditions for the driving (accelerating) operation of the vehicle, the explanation of which will be omitted.

Figure 17:
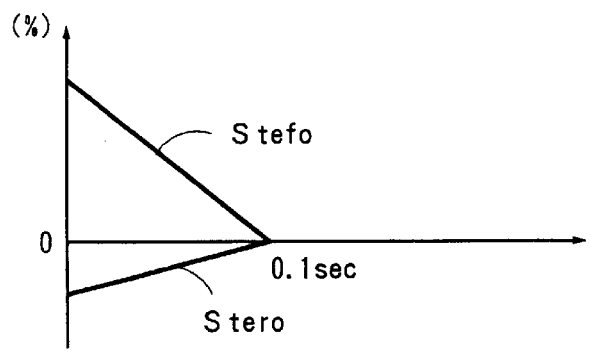
FIG. 17 is a diagram showing an example of a specific terminating control pattern according to above embodiment.

Whereas, if it is determined at Step 502 that the conditions for starting the tracing control have not been fulfilled, the program proceeds to Step 505 where the terminating conditions are determined. If it is determined that the terminating conditions for the tracing control are satisfied, the program proceeds to Step 506 where the start flag of the tracing control is cleared, and proceeds to Step 507 where a specific terminating control pattern will be set. This specific terminating control pattern is set in such a manner that the desired slip rates Stefo, Stero for the front and rear wheels located outside of the curve will be reduced to be zero within the period of a predetermined time (e.g., 0.1 sec) as shown in FIG. 17, for example.

Figure 9:
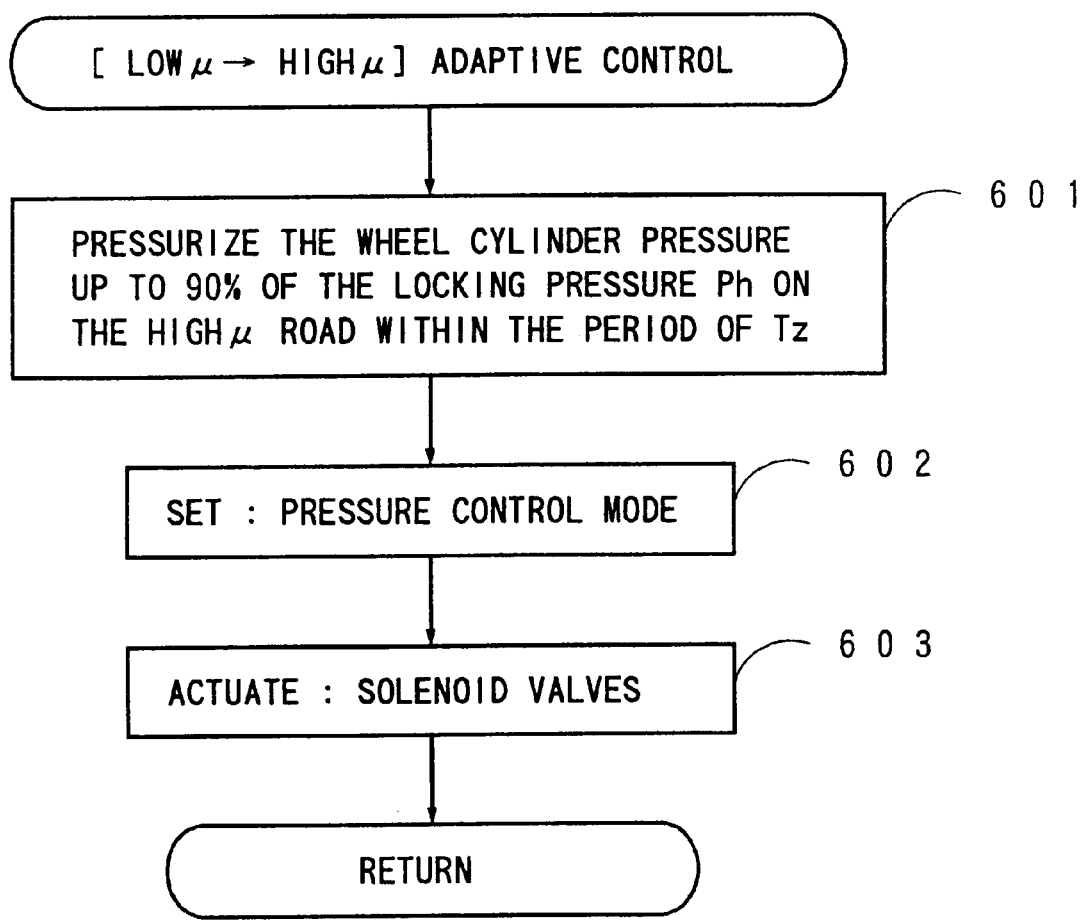
FIG. 9 is a flowchart showing a [low $\mu \rightarrow$ high $\mu$] adaptive control according to the above embodiment.
Figure 18:
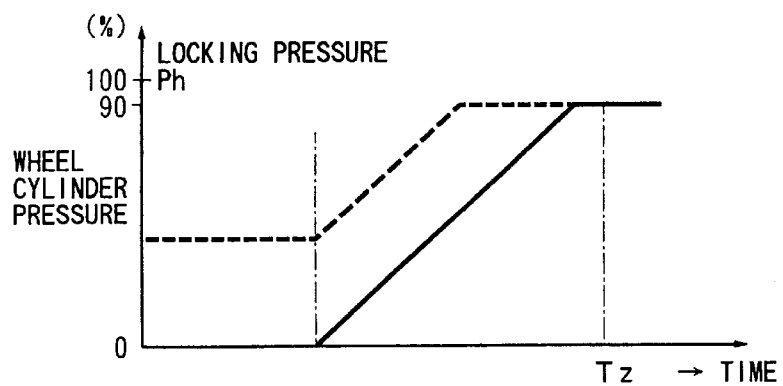
FIG. 18 is a diagram showing a wheel cylinder pressure varied when a vehicle moves from a road of low $\mu$ to a road of high $\mu$ according to the above embodiment.

FIG. 9 shows the process for the adaptive control performed at Step 122 in accordance with the change of the road surface when the wheel to be controlled moved from the road surface of relatively low μ to the road surface of relatively high μ. At Step 601, when the vehicle is travelling on the road surface of the high μ, the wheel cylinder pressure will be increased as shown in FIG. 18, until the pressure becomes a certain rate (e.g., 90%) of a locking pressure Ph, i.e., the wheel cylinder pressure for the wheel which will be locked within a predetermined time Tz, for example, and thereafter held to be in that pressure. In FIG. 18, a solid line indicates a state where the wheel cylinder pressure is increased from zero, while a phantom line indicates a state where the wheel cylinder pressure is increased from a certain pressure. The predetermined time Tz corresponds to a period which will take the vehicle to move from the road surface of low μ to the road surface of high μ, and it is calculated at Step 121 in FIG. 4 as described before. Then, a pressure control mode is set at Step 602, and the solenoid of each valve in the hydraulic pressure control apparatus PC is energized or de-energized at Step 603 in accordance with the mode set at Step 602, in the same manner as Step 421 in FIG. 7. As a result, the tracing control can be made with the vehicle stability maintained, even in case of the μ-jump.

According to the present embodiment, therefore, the steering control by braking is performed irrespective of depression of the brake pedal BP to provide the oversteer restraining control and/or the understeer restraining control. In addition, the steering control by braking is performed appropriately, even when the brake pedal BP is depressed to be in the braking condition. The braking force is controlled in accordance with the slip rate in the present embodiment. As to the desired parameter for use in the oversteer restraining control and the understeer restraining control, however, any desired parameters corresponding to the braking force applied to each wheel, other than the slip rate, may be employed, such as the hydraulic pressure in each wheel brake cylinder, for example.

It should be apparent to one skilled in the art that the above-described embodiment is merely illustrative of but one of the many possible specific embodiments of the present invention. For example, the present invention may be applied to a front drive vehicle, or even to a four-wheel drive vehicle. Numerous and various other arrangements can be readily devised by those skilled in the art without departing from the spirit and scope of the invention as defined in the following claims.

What is claimed is:

1. A braking force control system for an automotive vehicle comprising:

braking means for applying a braking force to each of front and rear wheels of said vehicle at least in response to depression of a brake pedal;

desired yaw rate setting means for setting a desired yaw rate in accordance with a motion of said vehicle;

actual yaw rate measuring means for measuring an actual yaw rate of said vehicle;

first varying rate calculation means for calculating a varying rate of the desired yaw rate set by said desired yaw rate setting means;

second varying rate calculation means for calculating a varying rate of the actual yaw rate measured by said actual yaw rate measuring means;

deviation calculation means for calculating a deviation between the varying rate of the desired yaw rate and the varying rate of the actual yaw rate; and limitation means for actuating said braking means to limit the varying rate of the actual yaw rate by applying the braking force to at least one of said wheels, when the deviation calculated by said deviation calculation means exceeds a predetermined value.

2. The braking force control system as claimed in claim 1, wherein said limitation means is adapted to actuate said braking means to apply the braking force to a front wheel of said wheels located on the outside of a curve in said vehicle's path.

3. The braking force control system as claimed in claim 2, further comprising coefficient of friction estimation means for estimating a coefficient of friction of a road surface for each wheel of said vehicle placed thereon, and wherein said limitation means is adapted to compare the estimated coefficient of friction for said front wheel located on the outside of the curve with a predetermined coefficient of friction, and actuate said braking means to apply the braking force to said front wheel located on the outside of the curve for a predetermined time, when it is determined that the coefficient of friction for said front wheel is lower than the predetermined coefficient of friction.

4. The braking force control system as claimed in claim 3, wherein said yaw rate setting means is adapted to set the desired yaw rate on the basis of the coefficient of friction estimated by said coefficient of friction estimation means, the desired yaw rate being set by said desired yaw rate setting means to be decreased in accordance with a decrease of the coefficient of friction.

5. The braking force control system as claimed in claim 1, further comprising motion control means for actuating said braking means to apply the braking force to at least one of said wheels in accordance with the motion of said vehicle, said motion control means actuating said braking means to apply the braking force to at least one of said wheels so as to cause an increase in turning radius, when an excessive oversteer occurs during vehicle motion, and said motion control means actuating said braking means to apply the braking force to at least one of said wheels so as to cause a decrease in turning radius, when an excessive understeer occurs during vehicle motion, and wherein said motion control means includes means for limiting the excessive understeer when the deviation calculated by said deviation calculation means exceeds a predetermined value.

6. The braking force control system as claimed in claim 1, wherein said actual yaw rate measuring means includes a lateral acceleration sensor for detecting a vehicle lateral acceleration;

said desired yaw rate setting means includes means for setting a desired lateral acceleration in accordance with a motion of said vehicle;

said first varying rate calculation means includes means for calculating a varying rate of the desired lateral acceleration set by said means for setting a desired lateral acceleration;

said second varying rate calculation means includes means for calculating a varying rate of the actual lateral acceleration detected by said lateral acceleration sensor;

said deviation calculation means includes means for calculating a deviation between the varying rate of the desired lateral acceleration and the varying rate of the actual lateral acceleration; and said limitation means includes means for actuating said braking means to limit the varying rate of the actual lateral acceleration by applying the braking force to at least one of said wheels, when the deviation of the lateral acceleration calculated by said deviation calculation means exceeds a predetermined value.

7. The braking force control system as claimed in claim 1, wherein said braking means comprises:

wheel brake cylinders operatively mounted on said wheels for applying the braking force thereto, respectively;

a hydraulic pressure generator for supplying a hydraulic braking pressure to said wheel brake cylinders; and actuating means disposed between said hydraulic pressure generator and said wheel brake cylinders for controlling the hydraulic braking pressure in said wheel brake cylinders.

8. The braking force control system as claimed in claim 7, wherein said hydraulic pressure generator includes a master cylinder for generating the hydraulic braking pressure in response to depression of said brake pedal, and an auxiliary pressure source for generating the hydraulic braking pressure irrespective of depression of said brake pedal.

* * * * *